FIG. 3

Inventors
Hans Haelsig, &
Karl Brumm
By H. E. Jones
Attorney

United States Patent Office 2,942,492
Patented June 28, 1960

2,942,492

CHANGE-SPEED MECHANISM

Hans Haelsig and Karl Brumm, Ruesselsheim am Main, Germany, assignors to General Motors Corporation, Detroit, Mich., a corporation of Delaware Filed Nov. 21, 1957, Ser. No. 698,005

Claims priority, application Germany Nov. 21, 1956

7 Claims. (Cl. 74—477)

This invention relates to change speed transmissions and in particular to such transmissions as incorporate two parallel reciprocable rails, means associated with said rails selectively to introduce one of a plurality of drive ratios, a reciprocable rotatable selector shaft transverse to said rails and arms on said selector shaft adapted selectively to engage said rails upon reciprocation of said selector shaft.

By this means, any one of four drive ratios can be introduced, that is, two drive ratios for each shift rail. These drive ratios are usually three forward drive ratios and one reverse.

The invention permits at least one more drive ratio to be introduced by the incorporation of an auxiliary parallel reciprocable rail and means associated with said rail to introduce a drive ratio.

Accordingly, there are provided in a change speed transmission, two parallel reciprocable rails and an auxiliary parallel reciprocable rail, means associated with said rails for introducing a plurality of drive ratios, a reciprocable, rotatable selector shaft transverse to said rails, arms on said selector shaft adapted selectively to engage said two rails upon reciprocation of said selector shaft, co-operating pairs of formations rigid with said two rails and said selector shaft, each pair including a formation on said selector shaft and a formation on one of said two rails, the formations of one pair being adapted to engage in response to selector shaft reciprocation and constitute interlocking means to lock either rail when the other rail is to be reciprocated and the formations of both pairs being adapted to engage and constitute interlocking means to lock said two rails when the auxiliary rail is to be reciprocated, and means to rotate and reciprocate said selector shaft.

From another aspect of the invention, there are provided in a change speed mechanism, two parallel reciprocable rails and an auxiliary parallel reciprocable rail, means associated with said rails selectively to introduce one of a plurality of drive ratios, a reciprocable, rotatable selector shaft transverse to said rails, arms on said selector shaft, said selector shaft being movable between a centre and two end positions, in each of which one of said arms operatively engages one of said rails, a formation parallel to, spaced from and rigidly connected to one of said two rails for operative engagement by one of said arms on said selector shaft in said centre position of said selector shaft, and means to rotate and reciprocate said selector shaft.

Preferably, there is a formation on the other of said two rails for operative engagement by another of said arms on said selector shaft in one of said two end positions of said selector shaft, a releasable detent operatively engaged with said selector shaft to permit movement thereof between said centre and said one end position and to prevent inadvertent movement thereof to the other of said end positions.

There may also be incorporated a formation operatively engaged with said auxiliary rail and adapted to be engaged by one of said arms on said selector shaft in one of said positions of said selector shaft, interengageable pin and bifurcated portions on said formation and said one arm. This formation is advantageously a pivoted lever.

The scope of the invention is defined by the appended claims; and how it can be carried into effect is hereinafter particularly described with reference to the accompanying drawings, in which:

Fig. 3 is a horizontal cross section taken along the lines 3—3 of Fig. 2;

Fig. 7 is a partial sectional view of Fig. 2 on the line 7—7; and

Fig. 8 is a partial sectional view of Fig. 2 on the line 8—8.

Figure 1:
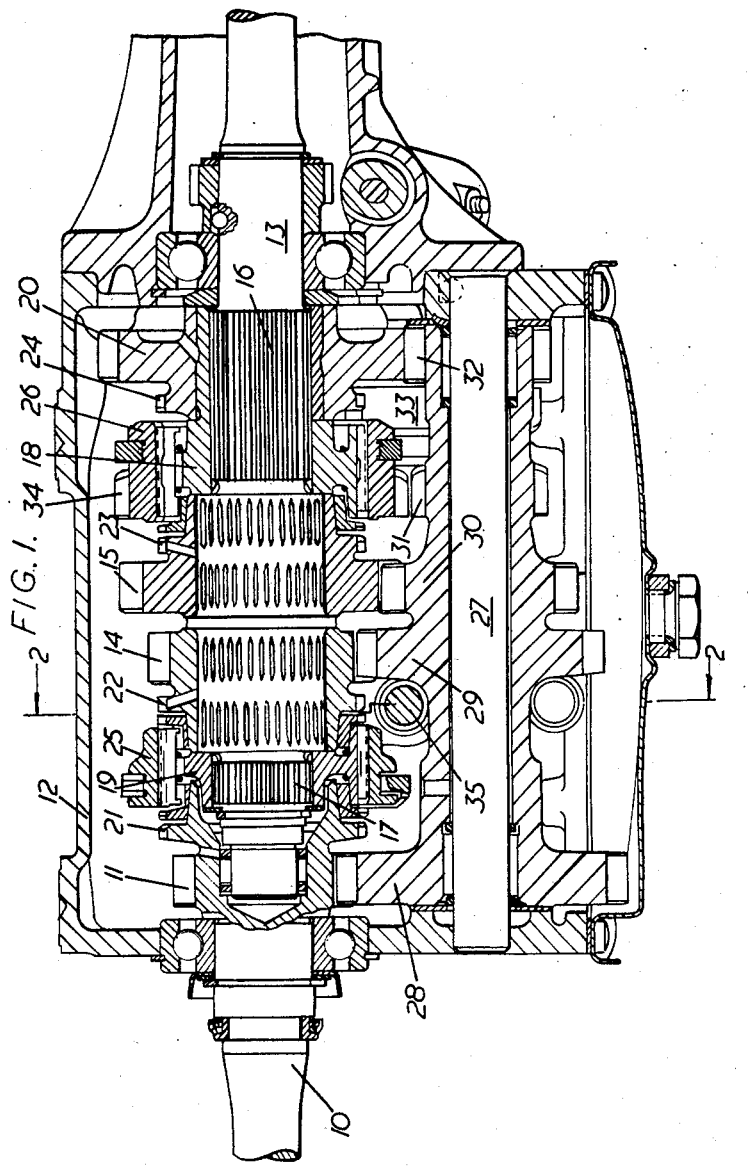
Fig. 1 is a longitudinal vertical cross section of a change-speed transmission with four forward and one reverse speeds incorporating the invention.

Referring to Figure 1, the input shaft 10 is integral with or rigidly connected to a main top-speed gear 11 and is carried by a conventional bearing fitted into the front wall of the case 12. A co-axial mainshaft 13 is piloted at its front end in a roller bearing in the clutch gear 11 and is supported in a mainshaft rear bearing in the case 12. Third and second speed gears 14 and 15 respectively, are freely and rotatably journaled on the mainshaft 13. The mainshaft 13 is also provided with two splined portions 16 and 17 on which hubs 18 and 19 of the first and second speed and third and top speed synchronising clutch assemblies are splined and retained against axail displacement. First speed gear 20 is freely rotatable on the hub 18. The gears 11, 14, 15 and 20 are provided with clutch teeth 21, 22, 23, 24. Clutch sleeves 25 and 26 are slidingly engaged with external splines on the hubs 19 and 18, respectively. With this arrangement, the clutch sleeve 26 can be shifted into mesh either with the clutch teeth 24 on the first speed gear 20 or with the clutch teeth 23 on the second speed gear 15. The sleeve 25 can be meshed either with the clutch teeth 22 on the third speed gear 14 or with the clutch teeth 21 on the top speed gear 11. Conventional synchronizer devices are inserted between the clutch sleeves 25 and 26 and the clutch teeth 21, 22 and 23. These synchronizer devices do not constitute part of this invention and are therefore not described in detail.

A countershaft 27 is secured in the case 12 and carries rotatably on needle bearings an assembly of gears 28, 29, 30, 31 and 32. The gear 28 is in constant mesh with the gear 11, the gear 29 is in constant mesh with the third speed gear 14, the gear 30 is in constant mesh with the second speed gear 15 and the gear 32 is in constant mesh with the first speed gear 20. A reverse gear 34 is formed on the external periphery of the clutch sleeve 26. A reverse idler gear 33 (Figures 4 and 5) is slidably and rotatably mounted on an idler shaft 33a secured in the case 12.

Movement of the third and fourth speed clutch sleeve 25 is effected by a shift fork 50 (Figure 3) secured to a third and fourth speed shift rail 46 slidably mounted in the case 12 on the same side of the mainshaft 13 as the reverse idler gear 33 and shaft 33a. Movement of the first and second speed clutch sleeve 26 is effected by a shift fork 48 secured to a first and second speed shift rail 45 slidably mounted in the case 12 on the opposite side of the mainshaft 13 to the rail 46. Each of the shift rails 45 and 46 has three grooves 52, corresponding to the three positions of the corresponding shift fork and clutch sleeve, one of which grooves is engageable by a spring loaded detent ball.

Movement of the reverse idler gear 33 is effected by a shift fork 51 secured to a reverse shift rail 47 (Figure 4) slidably mounted in the case 12 on the same side of the mainshaft 13 as the rail 46.

A transverse selector shaft 35 (Figure 2) is slidably and rotatably supported in bores 36 and 37 in opposite side walls of the case 12. A conventional seal 38 prevents oil leakage through the bore 36. A metallic cap 39 force-fitting into an enlarged portion of the bore 37, provides an oil-tight sealing. A lever arm 41 is connected to the selector shaft 35 at 40 outside the case 12 and is universally connected to a universally mounted lever 42. The latter is movable to rotate and slide the shaft 35 by conventional gearshift control mechanism (not shown).

Figure 6:
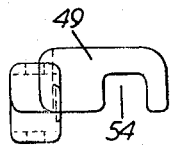
Fig. 6 is a side view of a part secured to a shift rail and viewed in the direction of the arrow 6 of Fig. 3.

The side of the shift rail 46 has a recess 61 (Fig. 3) with which can engage a shift cam 60 on an arm 44 secured to the shaft 35. A finger 49 is secured to the shift rail 45 and extends parallel thereto and spaced therefrom. The finger 49 has a recess 54 (Fig. 6) with which can engage a shift cam 53 on an arm 43 secured to the shaft 35.

The arm 43 on the shaft 35 has a rounded interlock groove 55 adjacent the shift cam 53 and the shift rail 45 has a rounded recess 56 shaped to fit the external surface of the arm 43. The arm 44 on the shaft 35 has a rounded interlock groove 62 adjacent the shift cam 60 and the shift rail 46 has a rounded recess 63 shaped to fit the external surface of the arm 44. When the shaft 35 is in the position shown in Figure 2 with the cam 60 engaged in the recess 61, the rounded groove 62 underlies the rail 46 to permit movement thereof between third, neutral and fourth speed positions. At the same time, the cam 53 is out of engagement with the recess 54 and movement of the rail 45 from neutral position is prevented by engagement of the arm 43 in the recess 56.

The arm 43 has a lower portion 57 in which is a transverse groove 58 engaged by a spring-pressed detent 59. This permits free longitudinal movement of the shaft 35 between the limits of the ends of the groove 58. That is from the position shown in Figure 2 to a position in which the cam 53 is engaged in the recess 54. In this position, the rounded groove 55 on the arm 43 underlies the rail 45 to permit movement of the rail 45 between first, neutral and second speed positions. At the same time, the cam 60 is out of engagement with the recess 61 and movement of the rail 46 from neutral position is prevented by engagement of the arm 44 in the recess 63.

Figure 2:
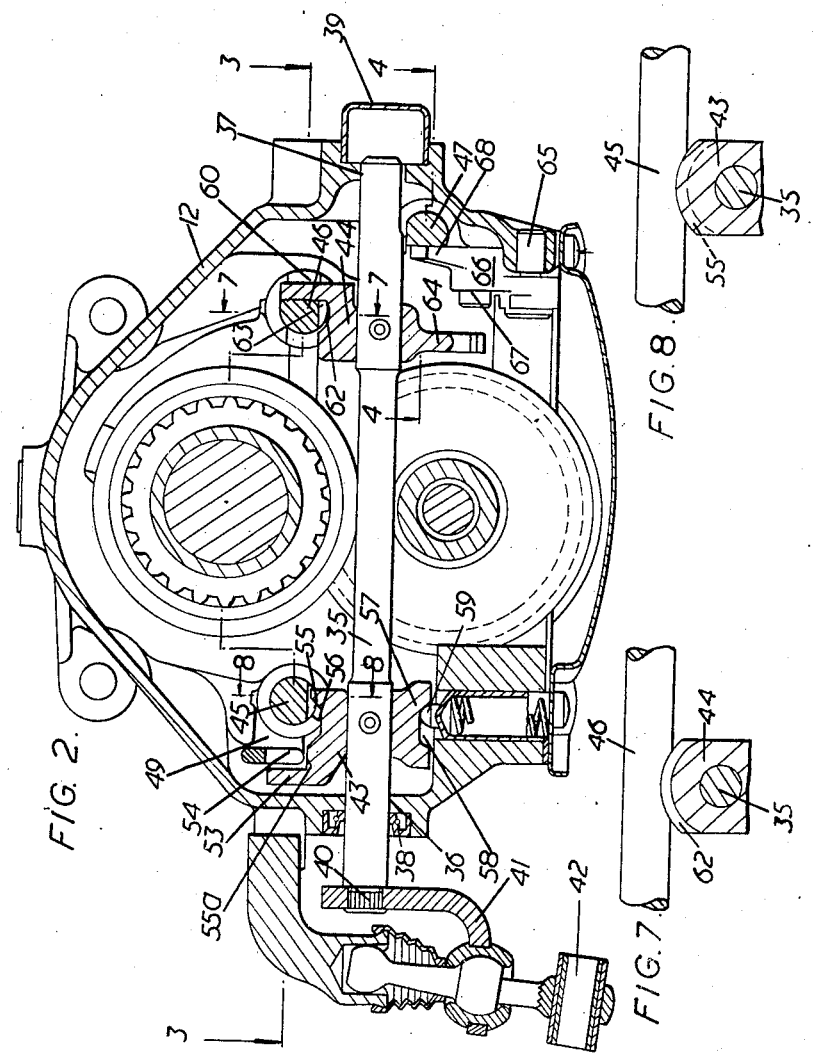
Fig. 2 is a vertical transverse cross section taken along the line 2—2 of Fig. 1.
Figure 4:
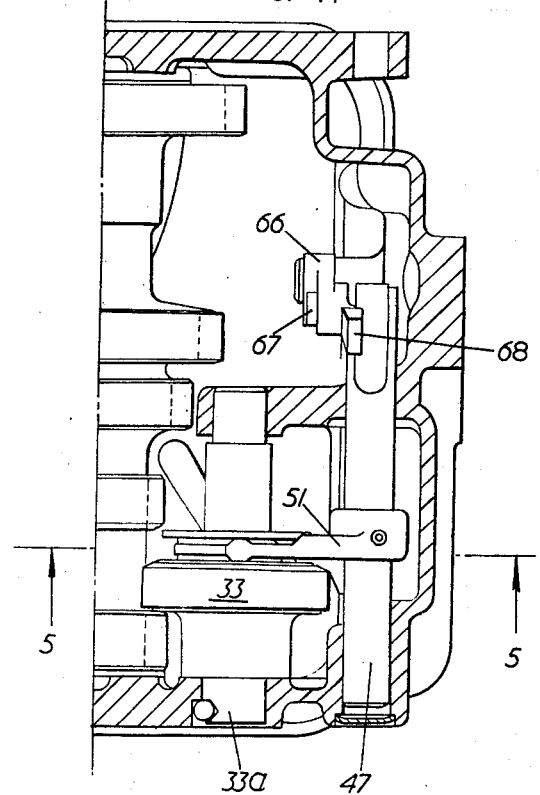
Fig. 4 is a horizontal cross section of one half of the transmission taken along the lines 4—4 of Fig. 2.
Figure 5:
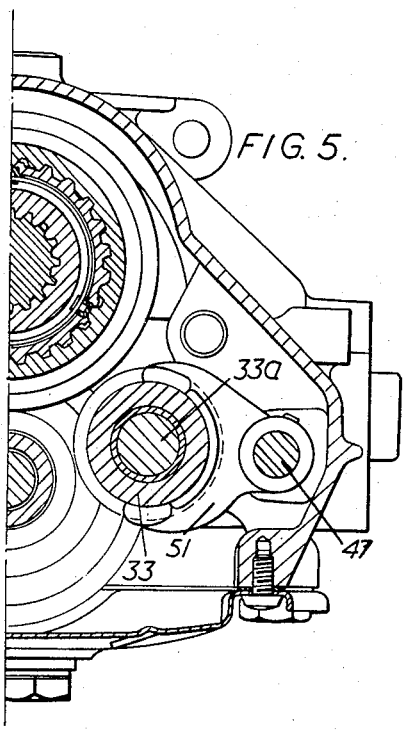
Fig. 5 is a vertical transverse cross section taken along the line 5—5 of Fig. 4.

A reverse shift lever 66 is pivoted on a transverse pin 65 in the case 12 (Fig. 2). The lever 66 has a shift cam 68 at its upper end engaged in a recess 69 in the reverse shift rail 47 (Fig. 4). The lever 66 also has a projecting pin 67 which may be engaged between the limbs of a depending bifurcated arm 64 (Fig. 1) of the arm 44 on the shaft 35. In the two positions of the shaft 35 referred to above, the bifurcated arm 64 does not engage the pin 67.

The shaft 35 is movable beyond the position set by the end of the groove 58 against extra resistance provided by the spring-pressed detent 59 which must be depressed before such further movement can occur. When the shaft 35 is in such a position that the pin 67 is engaged between the limbs of the bifurcated arm 64, the reverse shift rail 47 is movable from neutral to reverse position by pivotation of the lever consequent upon rotation of the shaft 35. At the same time, the arm 44 remains in the recess 63 of the rail 46 preventing movement thereof and the portion 55a of the arm 43 between the groove 55 and cam 53 enters the recess 56 to prevent movement of the rail 45. The cam 53 passes out of engagement with the recess 54 to lie between the finger 49 and the rail 45.

In each position of the shaft 35, rotation of the shaft causes longitudinal displacement of a shift rail and its shift fork.

Figure 3:
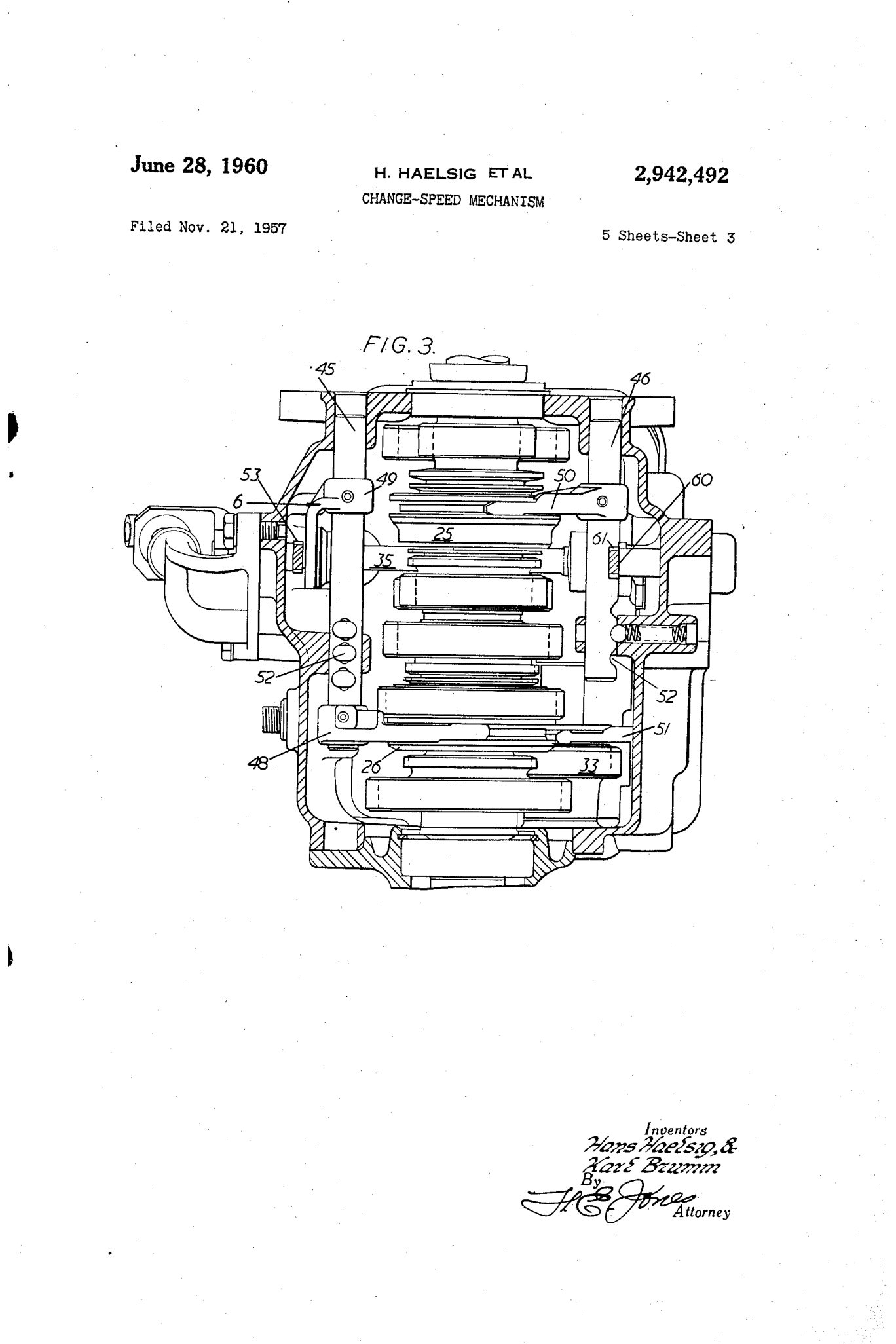

The transmission is shown in Figures 1, 2 and 3 in its neutral position and the selector shaft 35 is in position to select third or fourth speed, to which position it is urged by conventional spring means (not shown). The detent 59 is in contact with one end of the groove 58 (Fig. 2). The arm 43 is engaged in the recess 56 of the shift rail 45 and the cam 53 is not in engagement with the finger 49. Turning of the selector shaft 35 effected by the lever 41 does not cause the shift rail 45 to move lengthwise. The cam 60 of the arm 44 is in engagement with the recess 61 in the shift rail 46, the groove 62 underlies the shift rail 46 and bifurcated portion 64 does not engage the pin 67 on the lever 66. Turning of the selector shaft 35, after the resistance of the detent engaging the groove 52 has been overcome, causes a longitudinal displacement of the shift rail 46 with its fork 50 to engage third or fourth speed.

If the selector shaft 35 is shifted longitudinally until the detent 59 contacts the other end of the groove 58, the groove 55 of the arm 43 underlies the shift rail 45. Simultaneously the cam 53 of the arm 43 is engaged in the recess 54 of the finger 49. The cam 60 of the arm 44 is disengaged from the recess 61 of the shift rail 46, the bifurcated arm 64 does not engage the pin 67 of the lever 66 and the arm 44 engages in the recess 63.

Turning of the selector shaft 35 by the lever 41, after the resistance of the detent engaging the groove 52 of the shift rail 45 has been overcome, causes a longitudinal displacement of the shift rail 45 and its fork 48 to engage first or second speed. Undesired displacement of the shift rail 46 is prevented by the engagement of the arm 44 in the recess 63.

Upon a further longitudinal displacement of the selector shaft 45, the detent 59 is pressed out of the groove 58 against its spring. The resistance of the detent 59 prevents unintentional displacement of the shaft 35. The bifurcated arm 64 of the arm 44 engages the pin 67 of the lever 66. The cam 60 of the arm 44 is out of engagement with the recess 61 in the shift rail 46 but the arm 44 engages the groove 63 of the shift rail 46 to prevent longitudinal displacement thereof. The cam 53 of the arm 43 lies between the shift rail 45 and the finger 49, and the portion 55a of the arm 43 engages the groove 56 of the shift rail 45 to prevent longitudinal displacement thereof. Rotation of the selector shaft 35 in this position causes pivotation of the lever 66 about the pin 65 and the cam 68 causes longitudinal movement of the rail 47 and its fork 51 to engage reverse.

Undesired longitudinal movement of the rail 47 in the forward speed positions of the shaft 35 may be prevented by interengaging formations on the rail 47 and shaft 35 as will be understood. In the reverse position of the shaft 35, such formations are disengaged. Such formations could be arranged on the lever 66 and shaft 35 or on the arm 44 and the lever 66 or rail 47, as will be understood. The lever 66 could be eliminated and the pin 67 be mounted on the rail 47 if sufficient longitudinal movement could be obtained by rotation of the arm 44.

While the embodiment of the invention shown in the drawings and described above constitutes a preferred embodiment it will be understood that other embodiments may be adopted, such as fall within the scope of the appended claims.

We claim:
1. In a change speed transmisison, two parallel re- ciprocable rails and an auxiliary parallel reciprocable rail, means asosciated with said rails for introducing a plurality of drive ratios, a reciprocable, rotatable selector shaft transverse to said rails, arms on said selector shaft adapted selectively to engage one of said two rails and said auxiliary rail upon reciprocation of said selector shaft and on rotation of said selector shaft to reciprocate the selectively engaged rail, co-operating pairs of formations rigid with each of said two rails and said cooperating arms on said selector shaft, each pair including a formation on said selector shaft and a formation on one of said two rails, one of said pairs of formations being adapted to engage in response to selector shaft reciprocation and constitute interlocking means to lock either rail when the other rail is to be reciprocated and both pairs of formations being adapted to engage and constitute interlocking means to lock said two rails when the auxiliary rail is to be reciprocated, and means to rotate and reciprocate said selector shaft.

2. In a change speed mechanism, two parallel reciprocable rails and an auxiliary parallel reciprocable rail, means associated with said rails selectively to introduce one of a plurality of drive ratios, a reciprocable, rotatable selector shaft transverse to said rails, an arm on said selector shaft for each of said rails, said selector shaft being movable between a centre and two end positions, in each of which a different one of said arms operatively engages a different one of said rails, a formation parallel to, spaced from and rigidly connected to one of said two rails, for operative engagement by one of said arms on said selector shaft in said centre position of said selector shaft and to permit free movement of said one arm in one end position on the far side of said formation and in another end position between said formation and said one rail, and means to rotate and reciprocate said selector shaft.

3. In a change speed mechanism, two parallel reciprocable rails and an auxiliary parallel reciprocable rail, means associated with said rails selectively to introduce one of a plurality of drive ratios, a reciprocable, rotatable selector shaft transverse to said rails, arms on said selector shaft, said selector shaft being movable between a centre and two end positions, in each of which one of said arms operatively engages one of said rails, a formation parallel to, spaced from and rigidly connected to one of said two rails for operative engagement by one of said arms on said selector shaft in said centre position of said selector shaft, a formation on the other of said two rails for operative engagement by another of said arms on said selector shaft in one of said two end positions of said selector shaft, a releasable detent operatively engaged with said selector shaft to permit movement thereof between said centre and said one end position and to prevent inadvertent movement thereof to the other of said end positions, and means to rotate and reciprocate said selector shaft.

4. In a change speed mechanism, two parallel reciprocable rails and an auxiliary parallel reciprocable rail, means associated with said rails selectively to introduce one of a plurality of drive ratios, a reciprocable rotatable selector shaft transverse to said rails, an arm on said selector shaft for each rail, said selector shaft being movable between a center and two end positions, in each of which a different one of said arms operatively engages a different one of said rails, a formation operatively engaged with said auxiliary rail and adapted to be engaged by one of said arms on said selector shaft, in one of said positions of said selector shaft, interengageable pin and bifurcated portions on said formation and said one arm, and means to rotate and reciprocate said selector shaft.

5. In a change speed mechanism, two parallel reciprocable rails and an auxiliary parallel reciprocable rail, means associated with said rails selectively to introduce one of a plurality of drive ratios, a reciprocable, rotatable selector shaft transverse to said rails, arms on said selector shaft, said selector shaft being movable between a centre and two end positions, in each of which one of said arms operatively engages one of said rails, a finger formation parallel to, spaced from and rigidly connected to one of said two rails and having a recess for operative engagement by one of said arms on said selector shaft in said centre positions of said selector shaft, a recess formation on the other of said two rails for operative engagement by another of said arms on said selector shaft in one of said two end positions of said selector shaft, a pivoted lever operatively engaged with said auxiliary rail, a bifurcated portion on the third of said arms on said selector shaft, a pin on said lever adapted to be engaged by said bifurcated portion in the other of said end positions of said selector shaft, a releasable detent operatively engaged with said selector shaft to permit movement thereof between said centre and said one end position and to prevent inadvertent movement thereof to the other of said end positions, and means to rotate and reciprocate said selector shaft.

6. In a change speed mechanism, two parallel reciprocable rails and an auxiliary parallel reciprocable rail, means associated with said rails selectively to introduce one of a plurality of drive ratios, a reciprocable, rotatable selector shaft transverse to said rails, arms on said selector shaft, said selector shaft being movable between a center and two end positions, in each of which one of said arms operatively engages one of said rails, a formation parallel to, spaced from and rigidly connected to one of said two rails for operative engagement by one of said arms on said selector shaft in said center position of said selector shaft, a formation on the other of said two rails for operative engagement by another of said arms on said selector shaft in one of said two end positions of said selector shaft, and means to rotate and reciprocate said selector shaft.

7. In a change speed mechanism two parallel reciprocable rails and an auxiliary parallel reciprocable rail, means associated with said rails selectively to introduce one of a plurality of drive ratios, a reciprocable, rotatable selector shaft transverse to said rails, arms on said selector shaft, said selector shaft being movable between a center and two end positions, in each of which one of said arms operatively engages one of said rails, a finger formation parallel to, spaced from and rigidly connected to one of said two rails and having a recess for operative engagement by one of said arms on said selector shaft in said center position of said selector shaft, a recess formation on the other of said two rails for operative engagement by another of said arms on said selector shaft in one of said two end positions of said selector shaft, a pivoted lever operatively engaged with said auxiliary rail, a bifurcated portion on the third of said arms on said selector shaft, a pin on said lever adapted to be engaged by said bifurcated portion in the other of said end positions of said selector shaft, and means to rotate and reciprocate said selector shaft.

References Cited in the file of this patent

UNITED STATES PATENTS

| 2,328,227 | Orr | Aug. 31, 1943 |
| 2,487,283 | Stewart et al. | Nov. 8, 1949 |
| 2,667,082 | Brock et al. | Jan. 26, 1954 |

FOREIGN PATENTS

| 859,997 | France | Sept. 20, 1940 |